(12) United States Patent
Hoagland

(10) Patent No.: US 6,364,350 B2
(45) Date of Patent: Apr. 2, 2002

(54) MOTOR VEHICLE OCCUPANT SAFETY DEVICE

(75) Inventor: Larry D. Hoagland, Noblesville, IN (US)

(73) Assignee: Unique Technologies, L.P., Carmel, IN (US)

( * ) Notice: Subject to any disclaimer, the term of this patent is extended or adjusted under 35 U.S.C. 154(b) by 0 days.

(21) Appl. No.: 09/866,958

(22) Filed: May 29, 2001

Related U.S. Application Data

(63) Continuation-in-part of application No. 09/321,171, filed on May 27, 1999, which is a continuation-in-part of application No. 08/734,041, filed on Oct. 18, 1996, now abandoned, which is a continuation of application No. 08/654,905, filed on May 22, 1996, now Pat. No. 5,893,580.

(51) Int. Cl.⁷ ............................................... B60R 21/22
(52) U.S. Cl. .................. 280/730.2; 280/729; 280/730.1
(58) Field of Search ................................ 280/741, 729, 280/730.1, 730.2, 728.1, 737

(56) References Cited

U.S. PATENT DOCUMENTS 3,756,621 A * 9/1973 Lewis et al.
3,981,518 A * 9/1976 Pulling .................... 280/730.1
4,130,298 A * 12/1978 Shaunnessey ............ 280/730.1

FOREIGN PATENT DOCUMENTS

FR          2109477    *  5/1972  ................. 280/736

* cited by examiner

*Primary Examiner*—Eric Culbreth
(74) *Attorney, Agent, or Firm*—Woodard, Emhardt, Naughton, Moriarty & McNett

(57) ABSTRACT

A motor vehicle occupant safety device has a canister of inflator gas secured outside the passenger compartment. At least one air bag is connected to the source, and at least a portion of the air bag is stowed in the "A" pillar generally laterally relative to the passenger-side occupant prior to collision. An airtight frangible seal separates the source from the air bag. Upon collision, an electrical signal causes the seal to rupture which allows the pressurized gas to flow freely into the air bag. As the bag inflates, it moves laterally across the front of the occupant rather than toward him producing a cushion in front of the occupant. There is also a novel air bag formed from an inner bag and an outer bag.

2 Claims, 15 Drawing Sheets

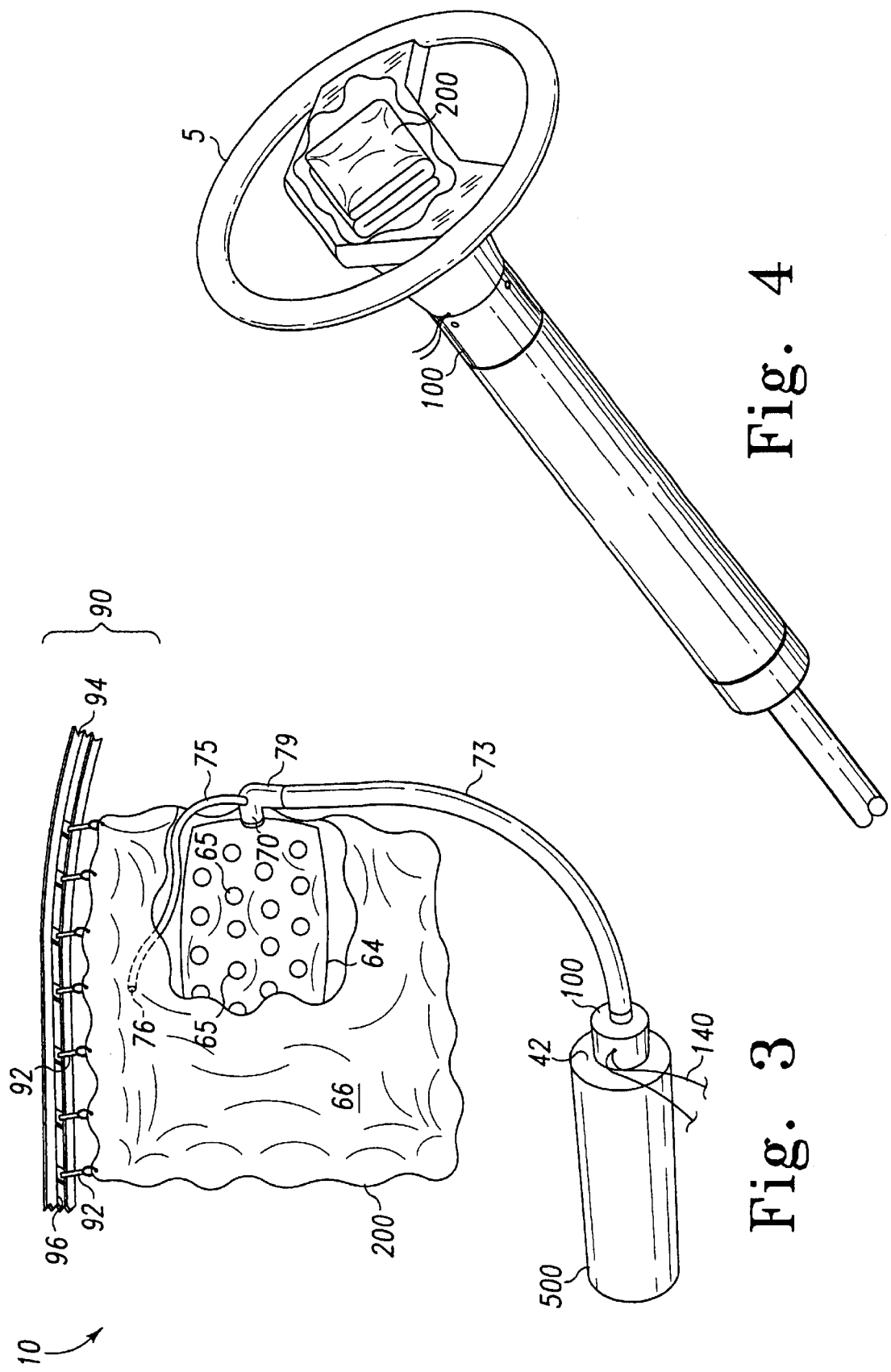

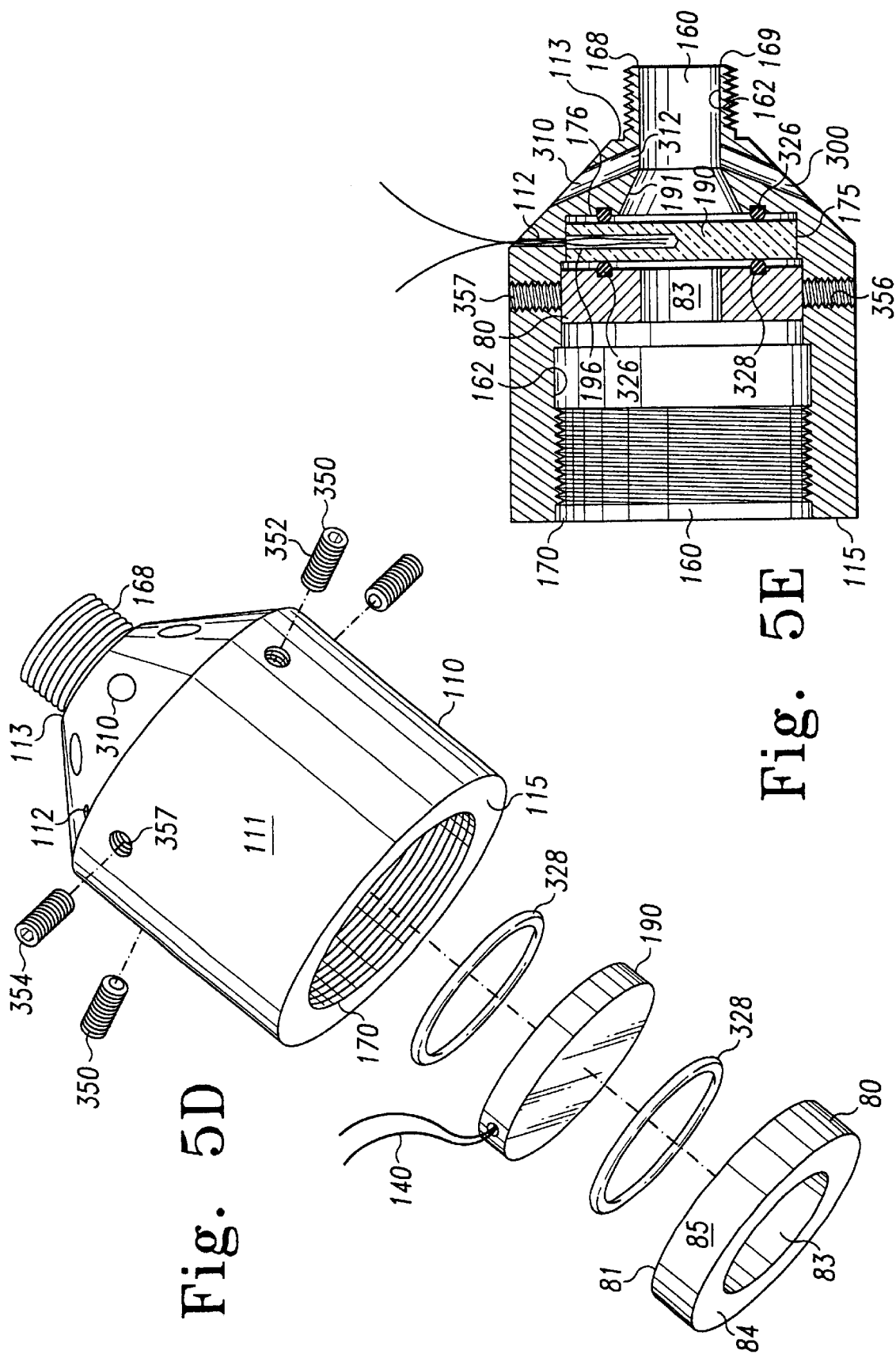

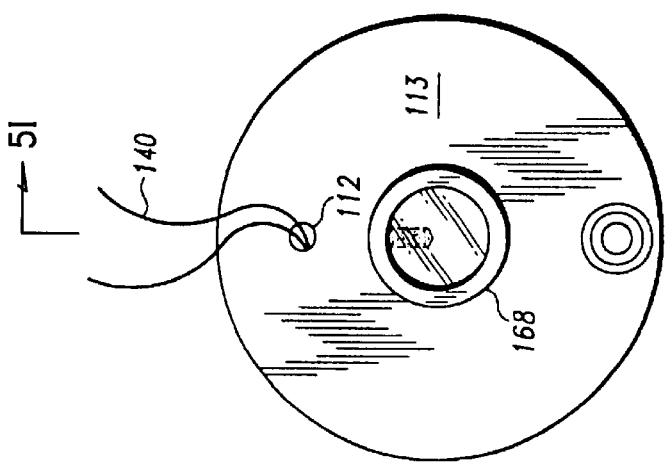
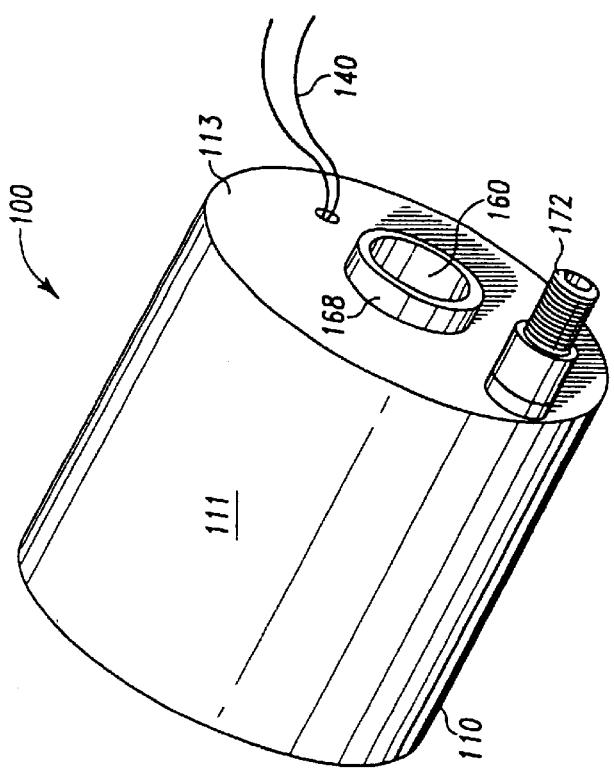

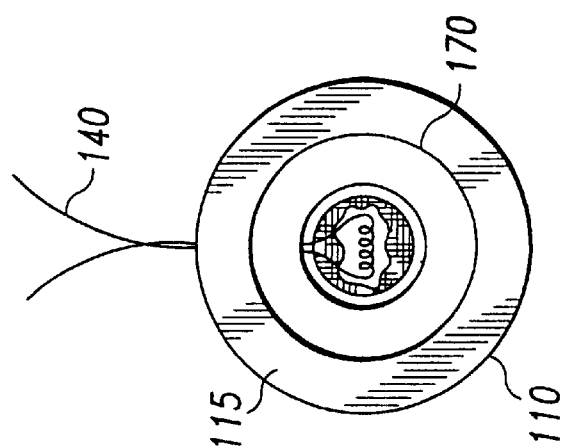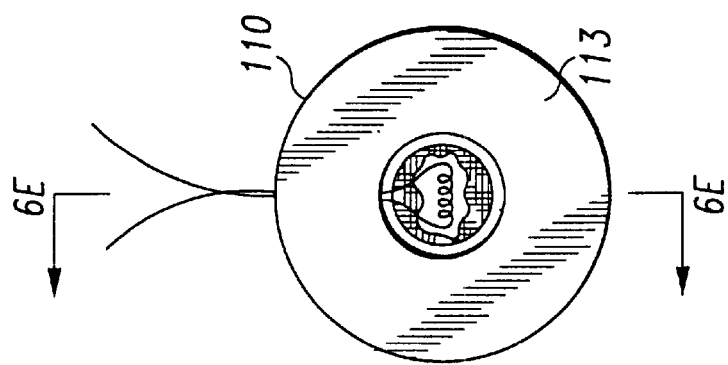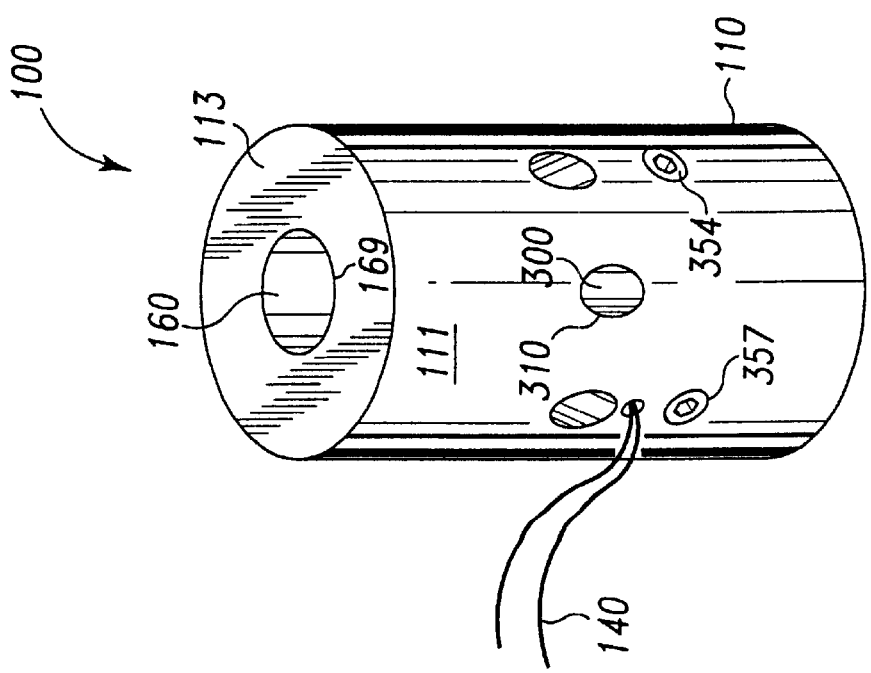

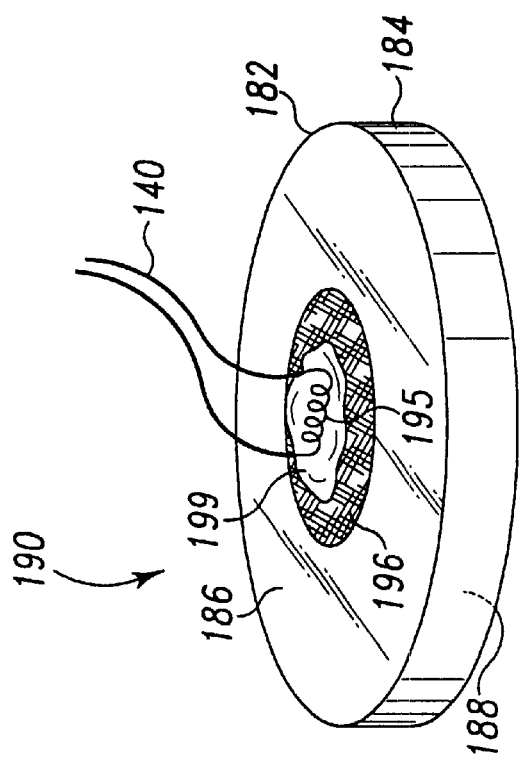
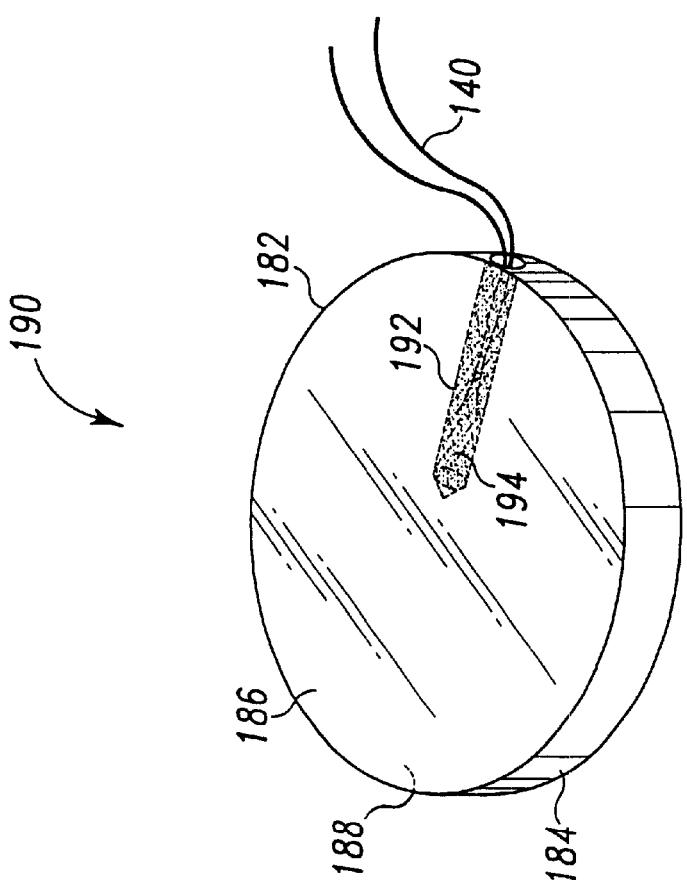
Fig. 8
Fig. 7

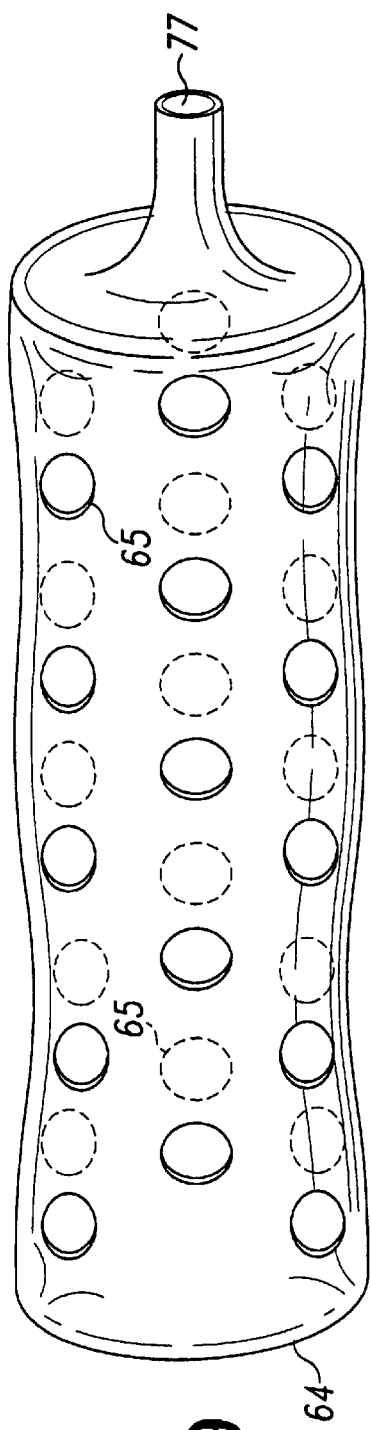
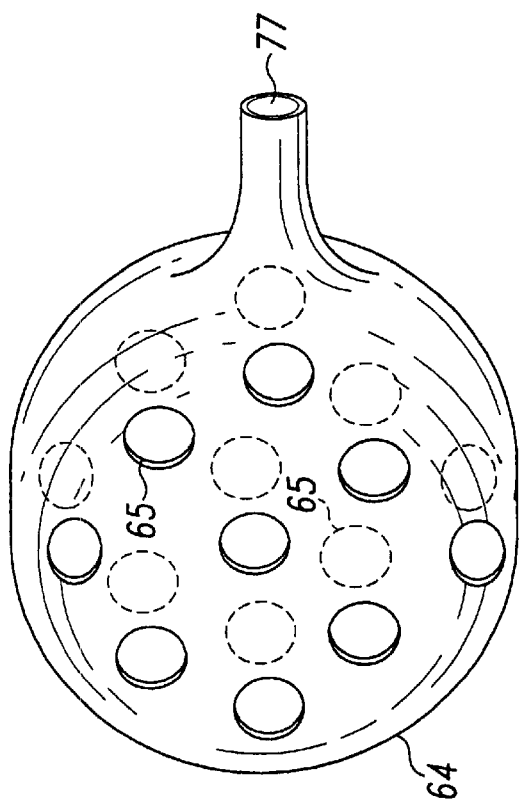
Fig. 9
Fig. 10

MOTOR VEHICLE OCCUPANT SAFETY DEVICE

This application is a continuation-in-part of application Ser. No. 09/321,171, filed May 27, 1999, which is a continuation-in-part of 08/734,041 filed Oct. 18, 1996, abandonded, which was a continuation of application Ser. No. 08/654,905 filed May 22, 1996, now U.S. Pat. No. 5,893,580.

BACKGROUND

The present invention pertains to vehicle safety devices and more particularly pertains to a motor vehicle occupant safety device.

Airbags were phased in to the U.S. motor vehicle fleet beginning in the mid-1980s when the Department of Transportation (DOT) required some form of automatic frontal crash protection for front seat occupants. The requirement was modified by the Congress in 1991 to an air bag mandate. All passenger cars in the U.S. must offer dual front air bags by Model Year 1998, and light trucks the following year.

Present air bag systems consist of four major parts: (1) a set of electronic sensors; (2) microprocessor; (3) polyamid bag; and (4) a gas generator. The sensors, commonly located in the front of the car, and the microprocessor constantly compute impulses of speed, acceleration, shocks, and braking patterns and compare them with data of crash patterns stored in the microprocessor. In the case of an accident, the microprocessor evaluates the severity of the crash and sets off the gas generator only if the car speed exceeds 20 mph. Although analysis shows that air bag systems are working generally as intended, these systems still have some drawbacks.

The first set of problems deals with the gas generator and gas flow control means which air bag manufacturers use for inflating their air bags. To ensure maximum protection it is vital that the air bag inflate in a matter of milliseconds. The fastest air bag systems to date depend on highly reactive substances, including sodium azide, which is toxic. Sodium azide inflators are comprised of aluminum-encased units that contain an igniter (squib), gas generant pellet or wafers of sodium azide, propellant and filters to screen out combustion products.

The sodium azide combustion reaction begins when the vehicle collision sensing means produces an electrical signal upon collision which ignites a few milligrams of initiator pyrotechnic material. That then ignites several grams of booster material which then ignites the sodium azide. Besides extreme heat, the reaction produces free sodium and nitrogen gas.

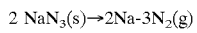

$$2\,NaN_3(s) \rightarrow 2Na\text{-}3N_2(g)$$

The free sodium from the combustion reaction can form sodium hydroxide when it contacts the water in people's noses, mouths, eyes and so forth. To prevent this, manufacturers mix in chemicals that will produce sodium salts on combustion, thus neutralizing the sodium.

Sodium azide inflator units often have a layer of matted material formed of alumina and silica in the particulate filter. This material is supposed to react with any of the remaining free sodium in the generated gas. Corn starch and talcum powder are also used as lubricants in the bag, and if the bag explodes, which is often the case when the structural liner fails because of the heat and force of the blast, these powders, as well as chemical residues from the reaction, contaminate people.

Sodium azide is toxic, and the mixture of chemicals is environmentally hazardous when not totally used up during the deployment of the air bag, or if only partially-combusted. Thus, sodium azide inflators pose a threat to the environment and must be disposed of according to government regulations.

Another set of problems with air bag systems today deals with the fact that present air bags inflate too aggressively. Not only does the rapid rate of the chemical reaction produce an explosive percussion which shatters the vehicle's windows and the occupant's ear drums, out the expanding nitrogen gas blasts the air bag, which is hard or stiff due to its structural liner, toward the occupant at speeds of approximately 200 mph. Thus, the National Highway Traffic Safety Administration (NHTSA) is very concerned that current air bag designs have adverse effects in some situations.

As of June 1996, NHTSA's Special Crash Investigation program had identified 21 crashes in which deployment of the passenger-side air bag resulted in fatal injuries to a child. Six of these deaths were to infants in rear-facing child seats. The other 15 children appear to have been unrestrained or improperly restrained (e.g., wearing only the lap belt with the shoulder belt behind them) at the time of the crash. According to NHTSA, all of these cases involved pre-impact braking. This combination of no, or improper, belt use and pre-impact braking resulted in the forward movement of the children such that they were close to the instrument panel and the air bag system at the time of the crash and the deployment of the air bag. Because of this proximity, the children sustained fatal head or neck injuries from the deployment of the passenger-side air bag. Thus, NHTSA has requested that so called "smart" air bags be developed and introduced into automobile fleets.

As defined by NHTSA, smart air bags are (1) ones which would prevent the air bag from deploying in situations where it might have an adverse effect, based, for example, on the weight, size and or location of the occupant, or (2) ones designed so that they would deploy in a manner that does not create a risk of serious injury to occupants very near the bag.

Vehicle manufacturers and air bag suppliers have produced some alternative designs. Among these are (1) a pressure sensitive mat in the passenger-side seat to deactivate the passenger-side air bag, unless a certain predetermined threshold weight is detected on the mat, (2) a rear-facing child seat detection "tag" which would deactivate the air bag upon detecting a rear-facing child seat equipped with a special tag and (3) a manual cutoff switch for turning off the passenger-side air bag system when, for example, a rear-facing child seat is positioned in the passenger seat. These proposed solutions are impracticable, unreliable and are not ready for production.

First, for the pressure sensitive mat to function the way it is intended, the child must be seated properly. However, as the statistics show, children appear to have been unrestrained, improperly restrained or out-of-position and in close proximity to the air bag at the time of the crash. Thus, it is unlikely the mat would significantly reduce injuries to this class of occupants. Additionally, a pressure sensitive mat and its electronic components are subject to wear and tear and may give no indication when they are worn, defective and in need of replacing.

Second, tag systems are inconvenient and costly. The corroborative efforts necessary between vehicle and/or air bag manufacturers and child seat manufacturers means an increase in the price of a "tagged" rear-facing child seat. Additionally, retrofitting existing rear-facing child seats with tags, as well as compatibility issues with multiple tag technologies, is likely to make these systems lag behind in their introduction into the auto safety restraint industry.

Third, manual switches depend on human operators; one may easily forget to turn on a manual cutoff switch after turning it off.

Finally, it is important that a motor vehicle occupant safety system meet original equipment manufacturer's (OEM) specifications and government standards and be economically feasible to implement into all foreign and domestic fleet automobiles.

Therefore, it is highly desirable to provide a new motor vehicle occupant safety device.

It is also highly desirable to provide a new motor vehicle occupant safety device that is capable of controlling the rate at which the air bag inflates.

It is also highly desirable to provide a new motor vehicle occupant safety device which inflates an air bag faster than prior inflator systems.

It is also highly desirable to provide a new motor vehicle occupant safety device which does not require the use of toxic chemicals, chemicals which generate extreme heat and/or cold or neutralizing or lubricating substances.

It is also highly desirable to provide a new motor vehicle occupant safety device which does not require complicated gas production, separation and flow control means.

It is also highly desirable to provide a new motor vehicle occupant safety device which does not cause a loud explosion.

It is also highly desirable to provide a new motor vehicle occupant safety device capable of using inflator gas stored in a canister outside the vehicle's passenger compartment.

It is also highly desirable to provide a new motor vehicle occupant safety device which requires neither a combustion reaction in order to inflate the bag nor a screen to filter out combustion products.

It is also highly desirable to provide a new motor vehicle occupant safety device that uses totally breathable gas to inflate the air bag.

It is also highly desirable to provide a new motor vehicle occupant safety device that deploys an air bag less aggressively.

It is also highly desirable to provide a new motor vehicle occupant safety device which automatically avoids injury to infants in rear-facing child seats when the air bag deploys.

It is also highly desirable to provide a new motor vehicle occupant safety device which automatically avoids injury to out-of-position children and unbelted or improperly belted children when the air bag deploys.

It is also highly desirable to provide a new motor vehicle occupant safety device which does not use a pressure mat, a tag system or a manual cutoff switch.

It is also highly desirable to provide a new motor vehicle occupant safety device which is production ready.

It is also highly desirable to provide a new motor vehicle occupant safety device which meets all the original equipment manufacturer's (OEM) specifications and required regulations, can be inexpensively manufactured and easily installed into any make and model of vehicle.

It is also highly desirable to provide a new air bag with a structural liner and that does not require lubricants.

It is also highly desirable to provide a new air bag capable of being deployed inside a vehicle in a manner that does not create a risk of serious injury to occupants very near the bag.

It is also highly desirable to provide a new air bag which is capable of inflating faster than current air bags.

It is also highly desirable to provide a new air bag which is capable of guiding the direction in which the air bag inflates.

It is finally highly desirable to provide a new motor vehicle occupant safety device which meets all of the above desired features.

SUMMARY

Therefore, it is an object of the invention to provide a new motor vehicle occupant safety device.

It is also an object of the invention to provide a new motor vehicle occupant safety device that is capable of controlling the rate at which the air bag inflates.

It is also an object of the invention to provide a new motor vehicle occupant safety device which inflates an air bag faster than prior inflator systems.

It is also an object of the invention to provide a new motor vehicle occupant safety device which does not require the use of toxic chemicals, chemicals which generate extreme heat and or cold or neutralizing or lubricating substances.

It is also an object of the invention to provide a new motor vehicle occupant safety device which does not require complicated gas production, separation and flow control means.

It is also an object of the invention to provide a new motor vehicle occupant safety device which does not cause a loud explosion.

It is also an object of the invention to provide a new motor vehicle occupant safety device capable of using inflator gas stored in a canister outside the vehicle's passenger compartment.

It is also an object of the invention to provide a new motor vehicle occupant safety device which requires neither a combustion reaction in order to inflate the bag nor a screen to filter out combustion products.

It is also an object of the invention to provide a new motor vehicle occupant safety device that uses totally breathable gas to inflate the air bag.

It is also an object of the invention to provide a new motor vehicle occupant safety device that deploys an air bag less aggressively.

It is also an object of the invention to provide a new motor vehicle occupant safety device which automatically avoids injury to infants in rear-facing child seats when the air bag deploys.

It is also an object of the invention to provide a new motor vehicle occupant safety device which automatically avoids injury to out-of-position children and unbelted or improperly belted children when the air bag deploys.

It is also an object of the invention to provide a new motor vehicle occupant safety device which does not use a pressure mat, a tag system or a manual cutoff switch.

It is also an object of the invention to provide a new motor vehicle occupant safety device which is production ready.

It is also an object of the invention to provide a new motor vehicle occupant safety device which meets all the original equipment manufacturer's (OEM) specifications and required regulations, can be inexpensively manufactured and easily installed into any make and model of vehicle.

It is also an object of the invention to provide a new air bag with a structural liner and that does not require lubricants.

It is also an object of the invention to provide a new air bag capable of being deployed inside a vehicle in a manner that does not create a risk of serious injury to occupants very near the bag.

It is also an object of the invention to provide a new air bag which is capable of inflating faster than current air bags.

It is also an object of the invention to provide a new air bag which is capable of guiding the direction in which the air bag inflates.

It is finally an object of the invention to provide a new motor vehicle occupant safety device which meets all of the above desired features.

In the broader aspects of the invention, a motor vehicle occupant safety device is provided for use in a vehicle having collision sensing means connected thereto for producing a signal in response to a collision. The motor vehicle occupant safety device has a source of inflator gas and at least one air bag connected to the source. The inflator gas is stored in a canister outside the vehicle's passenger compartment. The air bag is formed of an inner bag and an outer bag, and the inner bag is gas permeable. At least a portion of the air bag may be stowed in the "A" pillar generally laterally relative to the occupant prior to collision. An airtight seal separates the source from the air bag so that upon collision the signal causes rupturing means to rupture the seal allowing the pressurized gas to flow freely into the air bag. As the air bag inflates, carriage means moves the air bag laterally from the stowed position to an inflated position, thus forming a cushion in front of the occupant.

DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 3 is a perspective view of the embodiment of the invention of FIG. 2 shown removed from the vehicle.

FIG. 4 is a side elevational view of a steering column showing the gas flow control means and a cutaway view of the air bag of the invention.

FIG. 5D is an elevational view of the gas flow control means of FIG. 5A shown disassembled.

FIG. 5E is a full sectional view of the gas flow control means on the line 5E—5E of FIG. 5B in the direction of the arrows.

FIG. 5F is a pictorial view of another embodiment of the gas flow control means.

FIG. 5G is a top plan view of the gas flow control means of FIG. 5F.

FIG. 6A is a pictorial view of another embodiment of the gas flow control means of the invention.

FIG. 6B is a top plan view of the gas flow control means of FIG. 6A.

FIG. 6C is a bottom plan view of the gas flow control means of FIG. 6A.

FIG. 7 is a pictorial view of an embodiment of the seal of the invention.

FIG. 8 is a pictorial view of another embodiment of the seal of the invention.

FIG. 9 is a pictorial view of an embodiment of the inner bag of the invention.

FIG. 10 is a pictorial view of another embodiment of the inner bag.

DESCRIPTION

Figure 1:
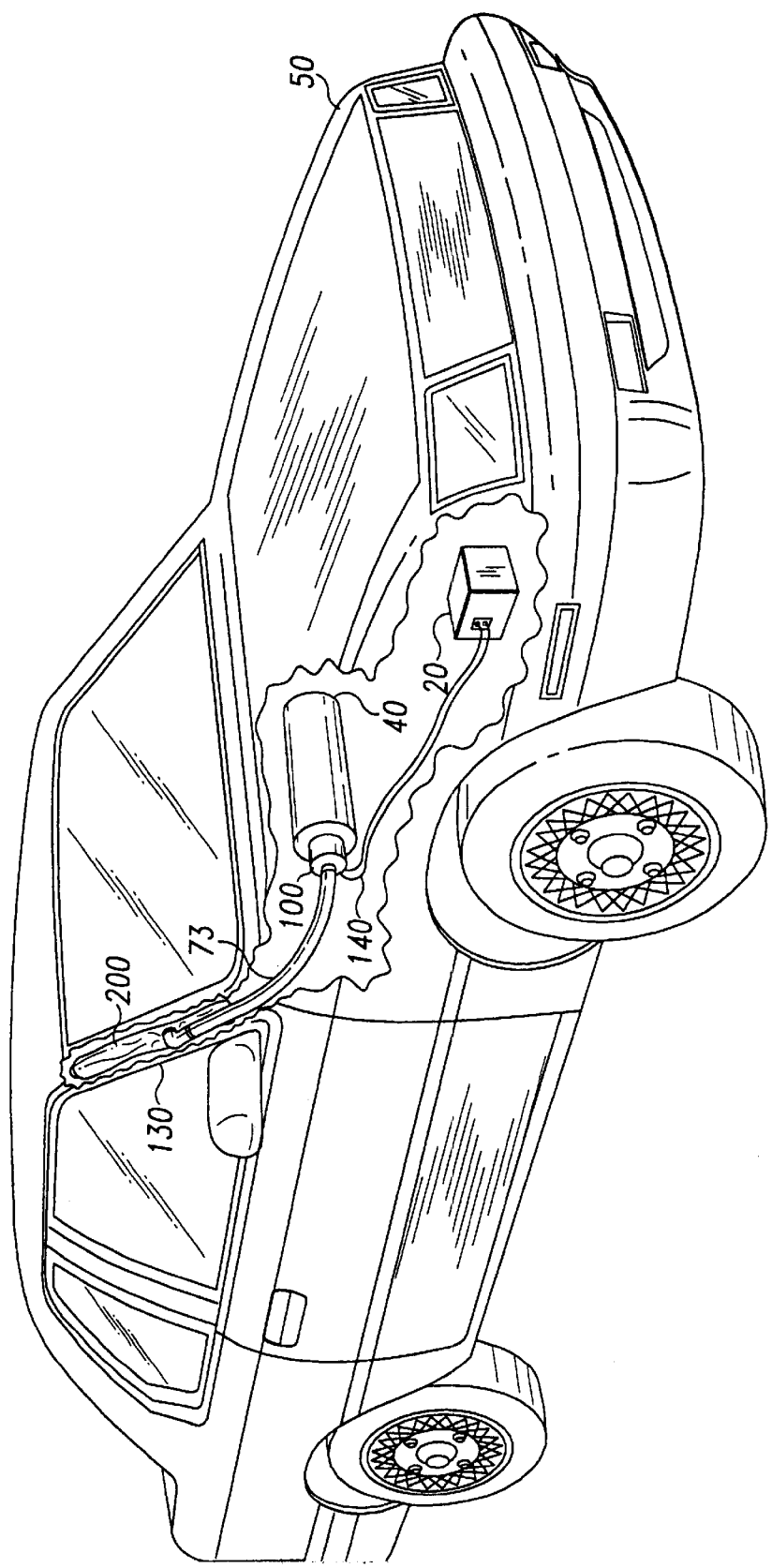
FIG. 1 is a cutaway side elevational view showing an embodiment of the motor vehicle occupant safety device of the invention installed in a vehicle.
Figure 2:
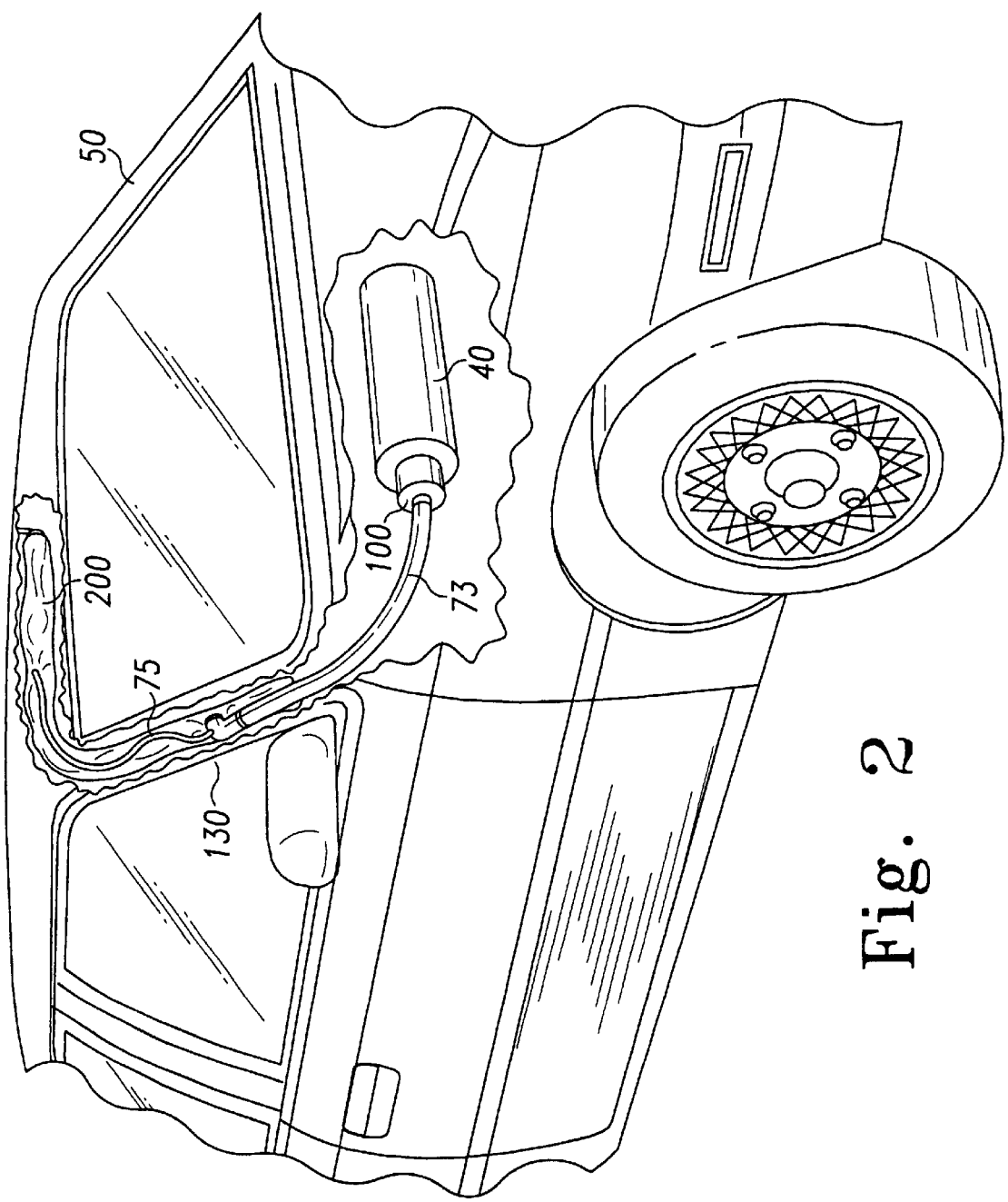
FIG. 2 is another cutaway side elevational view shorting another embodiment of the motor vehicle occupant safety device of the invention.

FIGS. 1 and 2 show different embodiments of motor vehicle occupant safety device 10 installed and in the stowed position in vehicle 50, and FIG. 3 shows the safety device 10 of FIG. 2 removed from vehicle 50. For purposes of illustration, the drawings show vehicle 50 as a car, however, safety device 10 is production ready for trucks, vans, sport utility vehicles and so forth.

Safety device 10 includes a source of inflator gas 40, such as canister 500, gas flow control means 100, air bag 200 and carriage means 90. Gas flow control means 100 is connected to collision sensing means 20 by wire 140 as shown in FIG. 1, and canister 500 is corrected to air bag 200 by first conduit Collision sensing means 20 is a standard sensing means generally comprised of a set of electronic sensors working in conjunction with a microprocessor. Canister 500, and/or a portion of conduit 73 may be secured near a source of heat, such as the vehicle manifold, muffler or heater coil, for example. Canister 500 is generally formed from corrosion resistant metal and may be insulated by known means. Canister 500 may be formed from an insulating material, so long as it is rigid and capable of containing pressurized fluid or gas at an elevated pressure of between about 600 and 1,000 p.s.i. Anyhdrous nitrogen gas has been found to be especially effective as a source of inflator gas, because it resists decomposition and has no water of crystallization. It is entertained that other breathable gasses may be used in connection with safety device 10.

Referring again to FIGS. 1, 2 and 3, first conduit 73 resides in "A" pillar 130 of vehicle 50 and connects canister 500, to air bag 200. Conduit 73 is preferably formed from plumbing pipe material, polyvinyl chloride (PVC) or other plastic composition, copper, steel, or the like, and includes elbow 79. In an embodiment, second conduit 75 is connected to first conduit 73 at elbow 79 and has terminal end 76 residing in outer bag 66, as shows in FIG. 3. Second conduit 75 is formed from a flexible material, such as plastic or rubber. Conduit 73 and "A" pillar 130 may be integrally formed, or the "A" pillar may serve as conduit 73, so long as gas flow control means 100 is connected in an airtight fashion between canister 500 and air bag 200 and "A" pillar 130 is airtight so as to not permit the inflator gas to escape.

Figure 12:
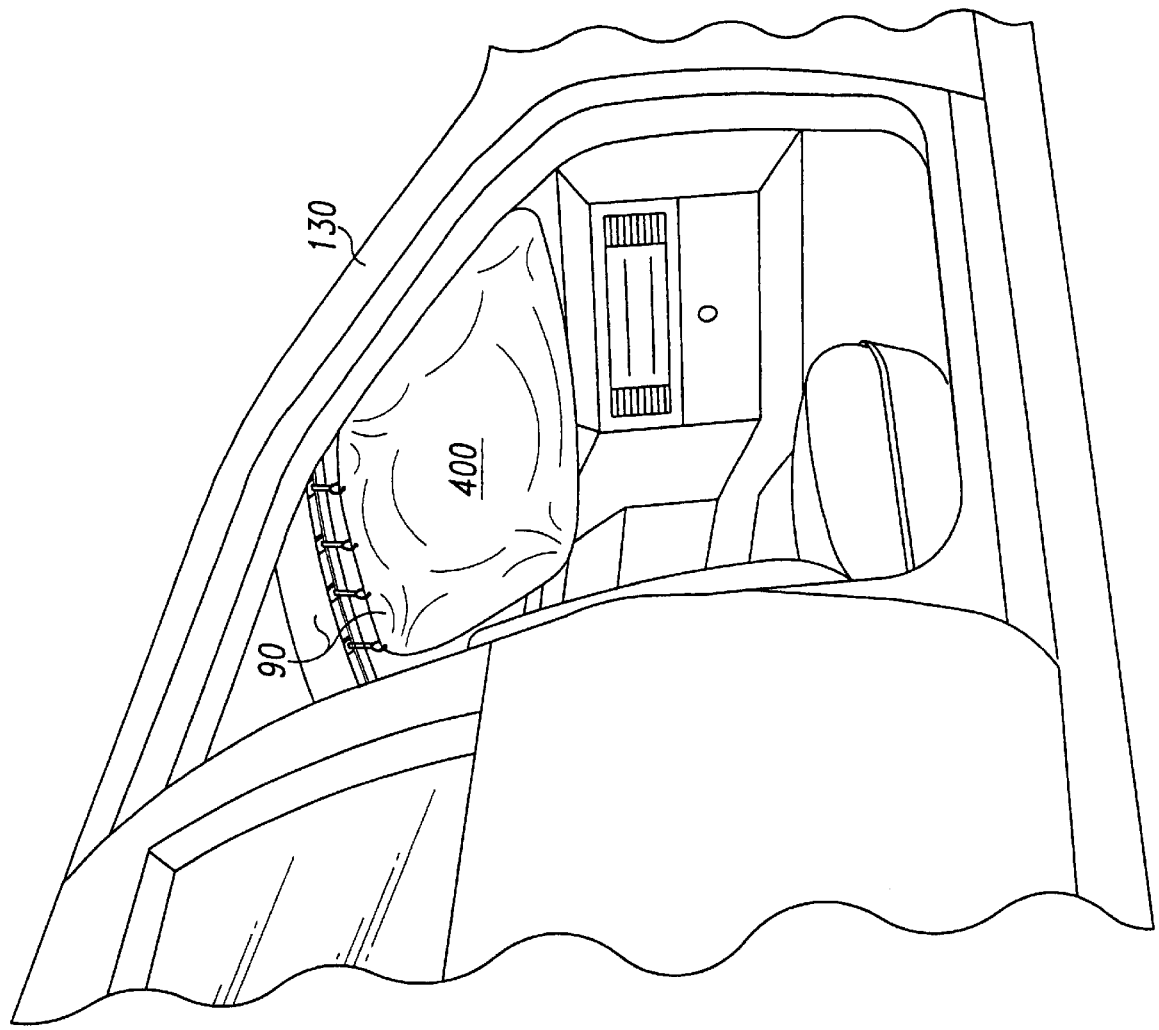
FIG. 12 is a side elevational perspective view of the safety device showing the air bag fully deployed.
Figure 13:
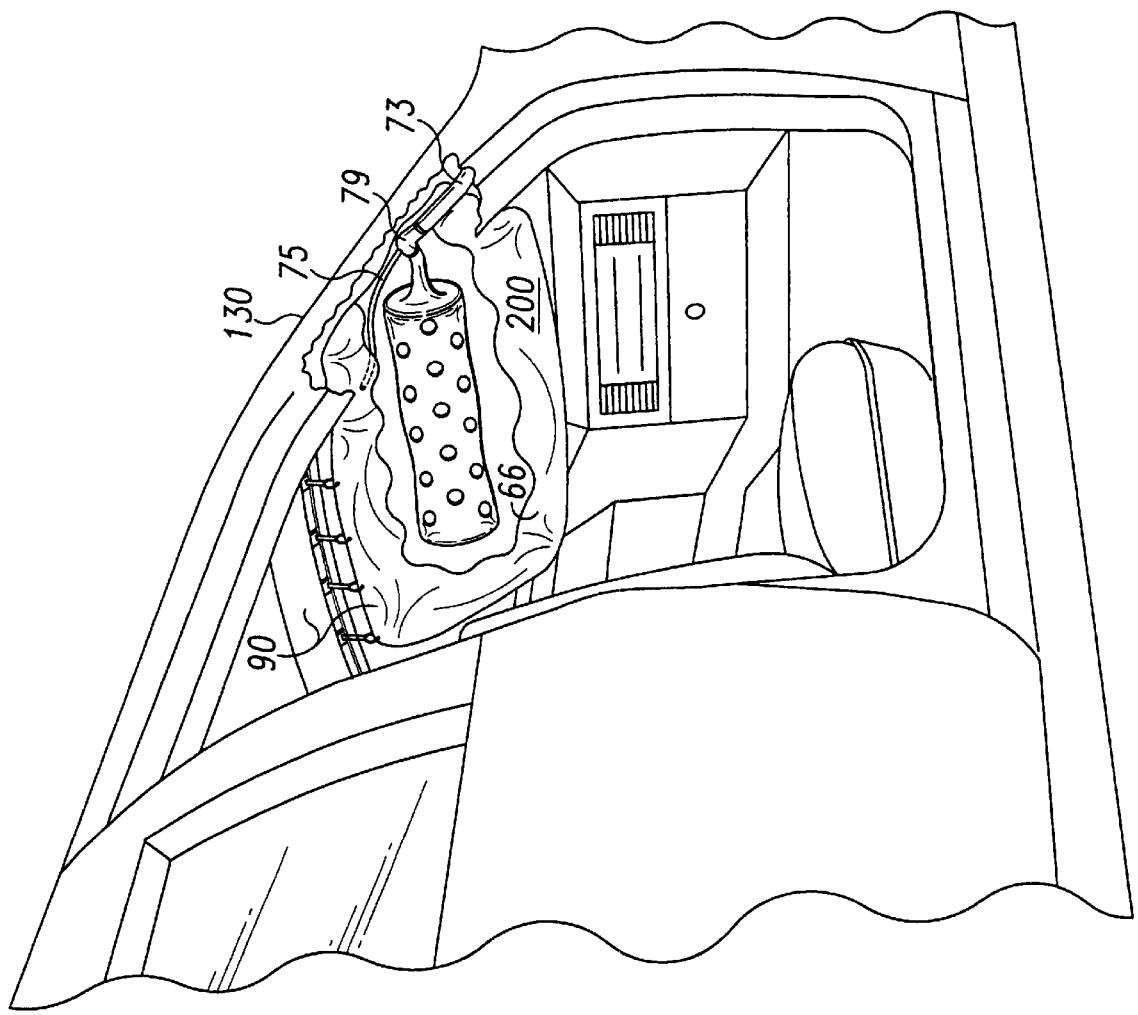
FIG. 13 is a cutaway side elevational view of the safety device of the invention showing the air bag fully deployed.

Air bag 200 is slidably connected to carriage means 90. In an embodiment, carriage means 90 includes guide member 94 with track 96. In that embodiment, guide member 94 is secured using known means, machine screws for example, to the interior ceiling of vehicle 50, as show in FIGS. 11–13. Hooks 92 are secured to air bag 200 at one end, and the other end of hooks 92 is adapted for slidably engaging track 96. Guide member 94 and hooks 92 are made of a rigid material and may be sewn, glued or otherwise secured to air bag 200.

Gas flow control means 100 separates gas source 40 from air bag 200. Gas flow control means 100 is connected in an airtight fashion to canister 500, as shown in FIGS. 1, 2 and 3. Gas flow control means 100 is for use in connection with any inflator gas source or canister, including present gas inflators used in connection with a driver-side air bag system or like the one represented in FIG. 4. Put another way, gas flow control means 100 is for use with any vehicle occupant safety system having a collision sensing means connected thereto for producing a signal in response to a collision, where it is desirable to control the flow of inflator gas into an air bag connected inside a vehicle and deployed upon collision to protect an occupant.

There are two primary embodiments of gas flow control means 100, one for use in connection with a driver-side air bag system (FIGS. 5A–5I) and another for use in connection with motor vehicle occupant safety device 10 of the invention FIGS. 6A–6E). Common structure between these embodiments may be interchangeable as desired and has been designated with the same numbers in the drawings.

Gas flow control means 100 includes body 110, which has exterior wall 111, top 113 and bottom 115. Body 110 is formed from machinable metal. A heat treated aluminum alloy, such as aircraft strength aluminum No. 6061, works best, since it offers a wide range of desirable mechanical properties. In the annealed condition it has good formability and can be welded by all methods. Additionally, body 110 may be coated using, a thin surface layer of high purity aluminum to improve both appearance and corrosion resistance. Body 110 can be fabricated by many of the commonly used techniques and machining apparatus. One or more stock aluminum pieces form generally cylindrically-shaped body 110. Body 110 may have portions with different diameters as well as tapered portions 320 and neck 168 for use in different models of vehicles as desired. Preferably body 110 is manufactured from two pieces pinned with metal rods and welded together. The pieces (not shown) which together may define body 110 are for the most part determined based upon the ease with which they may be manufactured. Separate cylindrical parts defining two coaxial portions joined together at a plane which dissects the seal cavity 175 have produced good results. Once assembled, body 110 is turned, and the weld and pins are ground so they are flush with exterior wall 111 producing a smooth singular body 110.

Referring to FIGS. 5A–6E gas flow control means 100 also has O-rings 328, frangible seal 190 and spacer member 80 inside axial bore 160, which extends through the length of body 110. Axial bore 160 includes interior bore wall 162 with entrance port 170, exit port 169 and seal cavity 175 formed therein. Seal cavity 175 has a bottom 176. Interior wall 162 has beveled portion 191. Access bore 112 joins exterior wall 111 of body 110 and cavity 175. Access bore 112 may extend generally parallel to the longitudinal axis of body 110 or generally transversely through body 110. Spacer member 80 has a central bore 83 extending therethrough, bottom 84 and ring abutting surface 81. Ring abutting surface 81 has at least one O-ring groove 326 formed therein in which resides O-ring(s) 328. Spacer member 80 is formed from the same material as body 110 and has a diameter smaller than the diameter of axial bore 160 at bottom of body 110.

In an embodiment, a plurality of air passages 300 extend obliquely through body 110. Each passage 300 connects the exterior wall 111 at an entrance port 310 with the interior wall 162 at an exit port 312 Set screw bores 357 extend transversely through body 110 and connect exterior wall 111 with interior wall 162. Set screw bores 357 receive set screws 350, each of which has a shaft 352 with threads 356 and a head 354. Another embodiment has refueling passage 179 extending through body 110 joining top 113 and interior wall 162 with check valve 172 removably secured in an airtight fashion therein. In that embodiment, shown in FIGS. 5F–5I, access bore 112 extends through body 110 and connects top 113 and seal cavity 175. Access bore 112 is generally parallel with the longitudinal axis of body 110.

Figure 5C:
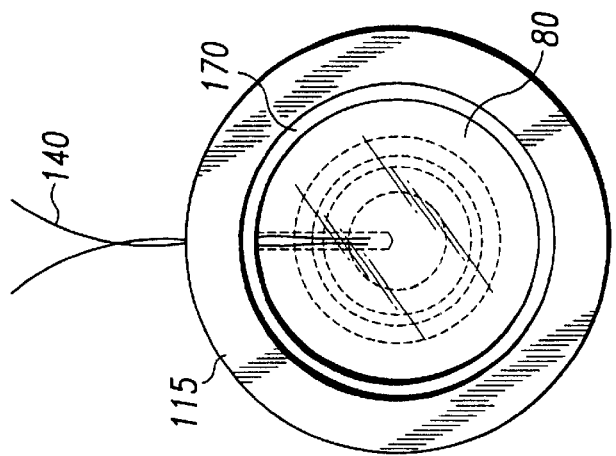
FIG. 5C is a bottom plan view of the gas flow control means of FIG. 5A.
Figure 5B:
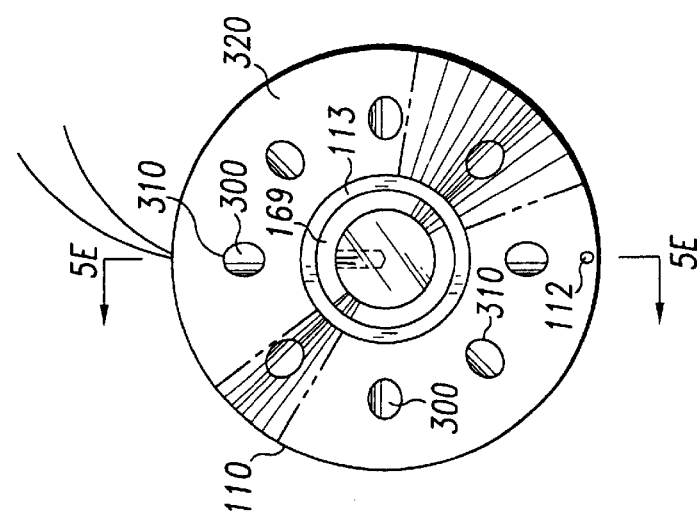
FIG. 5B is a top plan view of the gas flow control means of FIG. 5A.
Figure 5A:
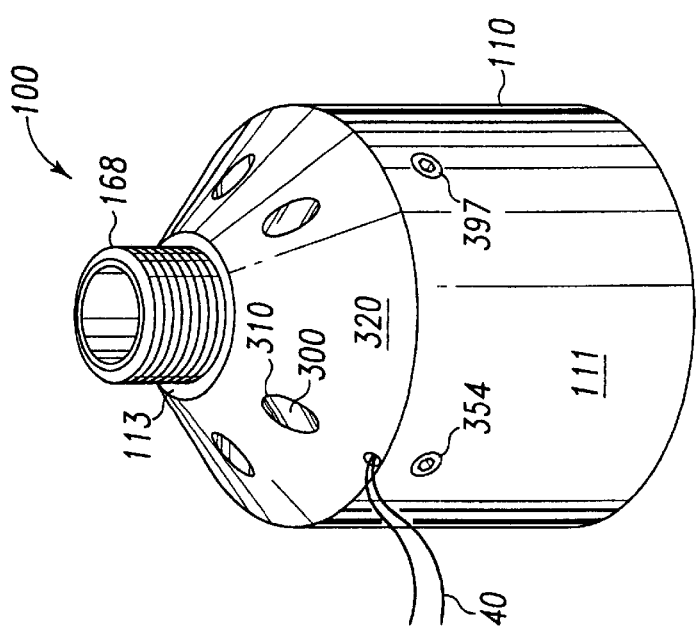
FIG. 5A is a pictorial view of an embodiment of the gas flow control means.
Figure 5I:
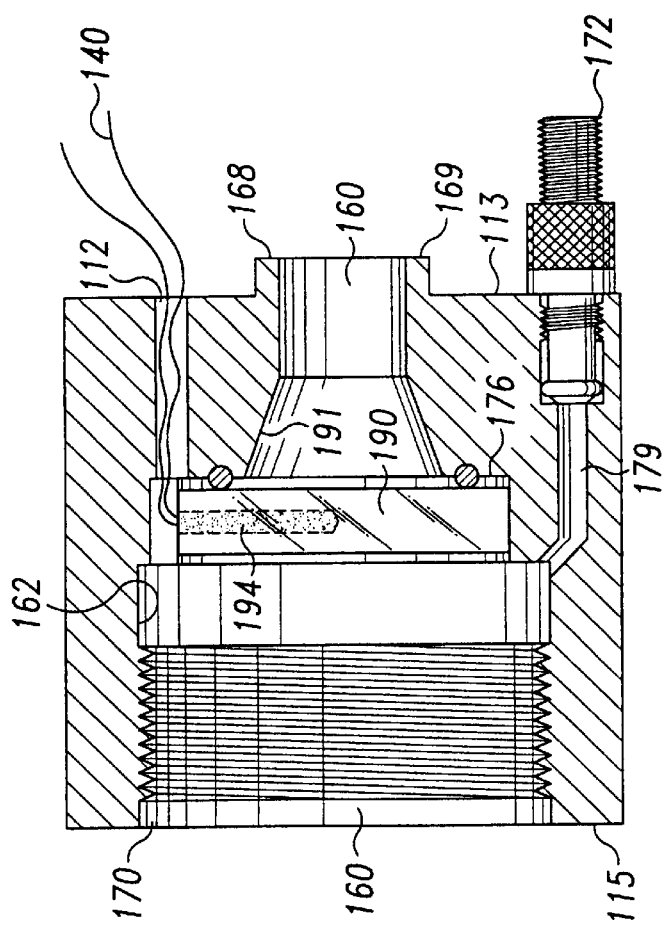
FIG. 5I is a full sectional view of the gas flow control means on line 5I—5I of FIG. 5G in the direction of the arrows.
Figure 5H:
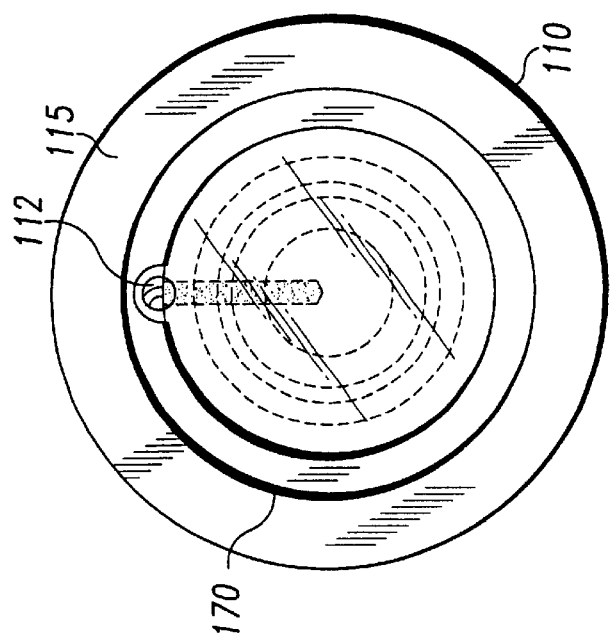
FIG. 5H is a bottom plan view of the gas flow control means of FIG. 5F.
Figure 6E:
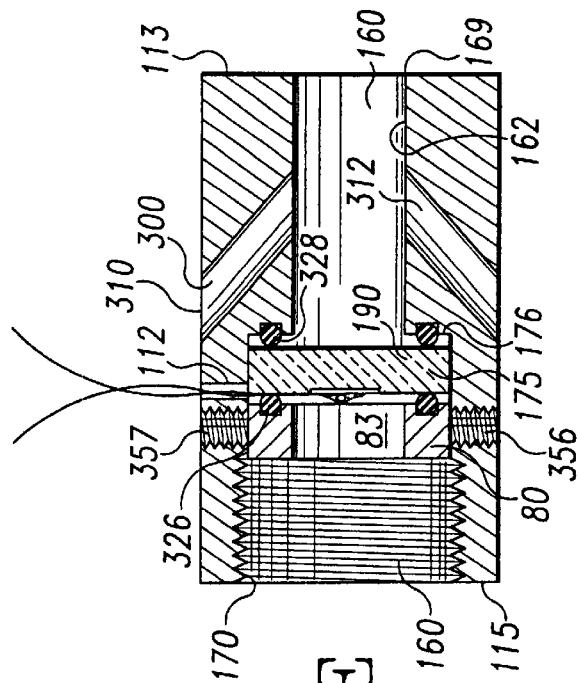
FIG. 6E is a full cross-sectional view of the gas flow control means on line 6E—6E of FIG. 6B in the direction of the arrows.
Figure 6D:
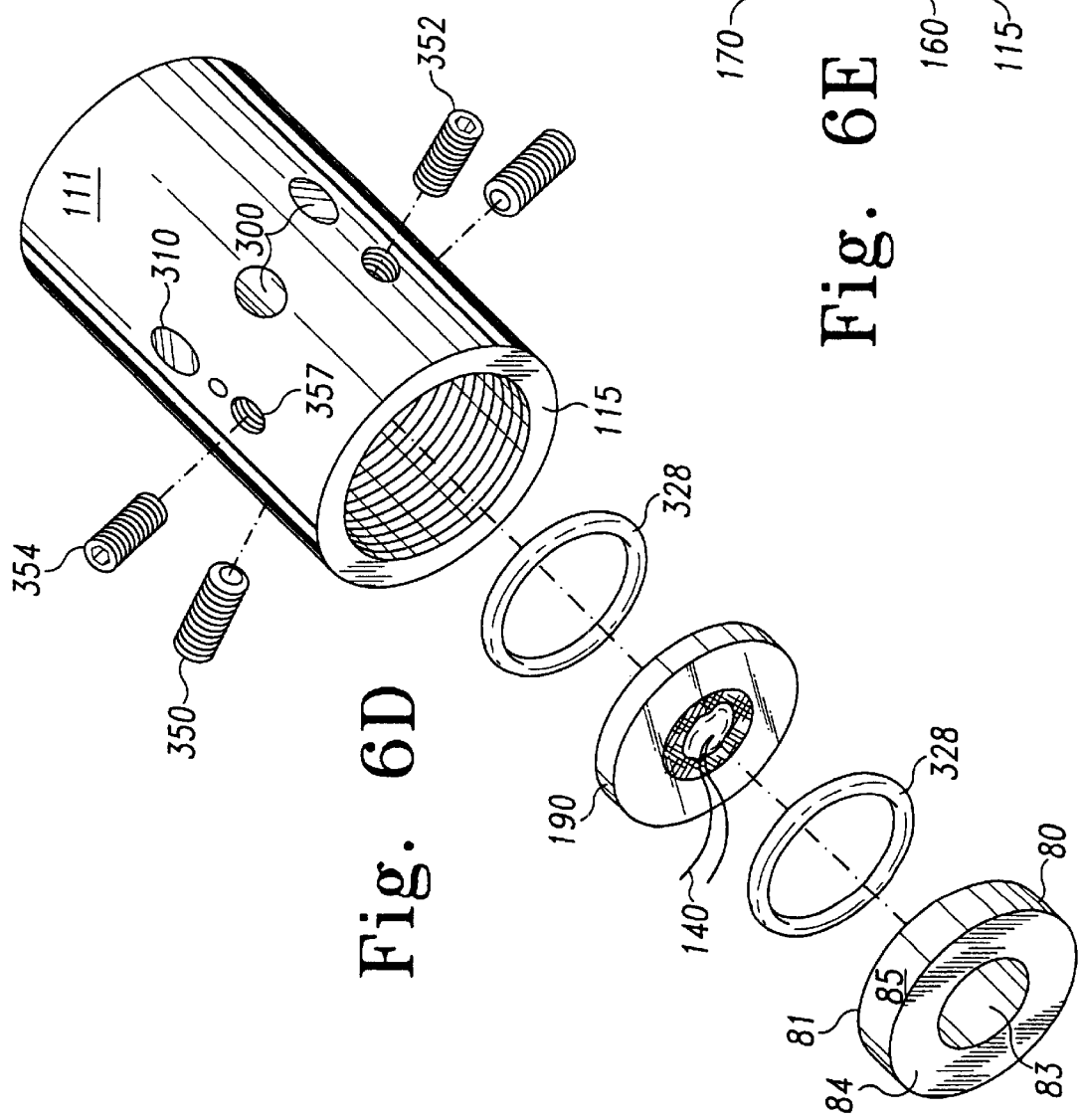
FIG. 6D is an elevational view of the gas flow control means of FIG. 6A shows disassembled.

Frangible seal 190 resides on bottom 176 of seal cavity 175 and occludes axial bore 160, as shown in FIGS. 5E, 5I and 6E. Bottom 176 of cavity 175 has at least one O-ring groove 326 in which resides O-ring(s) 328. Additional O-rings 328 may be positioned between bore wall 162 and spacer member 80 as desired, provided O-ring groove(s) 326 are formed therefor in exterior wall 85 of spacer member 80.

There are two preferred embodiments of frangible seal 190. Referring now to FIGS. 7 and 8, both embodiments include disc-shaped body 182 having opposite sides 186,188 and wall 184, which joins opposite sides 186,188. Disc-shaped body 182 may be integrally formed from a number of glass composites and may have tempered and/or annealed portions to accommodate fracturing as herein described.

The first embodiment has opposite sides 186,188 formed from a sodium lime glass composition and tempered wall 184 formed between opposite sides 186,188. In that embodiment, tempered wall 184 is drilled to form seal cavity 192 extending transversely into disc-shaped body 182, as shown in FIG. 7. A 0.050 g mixture of pentaerythritol tetranitrate (PETN), lead azide, potassium perchlorate, and sulfur makes up explosive charge 194, which resides in cavity 192. Charge 194 has an ignition temperature of approximately 300 degrees Fahrenheit and is capable of igniting by electrical means. Thus, as charge 194 is prepared and disposed in cavity 192, physical and static shock should be avoided and one should be shielded in case of accidental blast. All static discharge should be eliminated as well as sources of flame and high heat. It is entertained that charge 194 may be formed from other substances; however, the above mixture is presently the inventor's best mode.

The second embodiment of seal 190 includes element 195 secured to etched portion 196 of disc-shaped body 182, as shown in FIG. 8. Etched portion 196 is provided using known glass etching techniques, such as sand blasting. Etched portion 196 must be sufficiently textured so that adhesive, such as glue 199 can secure element 195 to etched portion 196 of wall 186 of disc-shaped body 182 with element 195 permanently contacting disc-shaped body 182. Element 195 is formed from a conductor having a melting point greater than disc-shaped body 182.

Referring to FIGS. 3 and 9 safety device 10 has air bag 200 which includes inner bag 64 and outer bag 66. Inner bag 64 is gas permeable, may have apertures 65 formed therein and may be shaped as desired, as shown in FIGS. 9 and 10. Inner bag 64 and outer bag 66 each have mouth 77. Inner bag 64 and outer bag 66 are formed from fabric material which meets original equipment manufacturer's (OEM) standards according to automobile safety regulations. Nylon has been found to provide the desirable foldability and strength necessary for air bag 200. Another embodiment of inner bag 64 does not have apertures 65, but rather is formed from a nylon mesh suitably permeable for air to pass therethrough at the desired rate herein later described during deployment of air bag 200.

Motor vehicle occupant safety device 10 may be assembled as follows. Preferably, canister 500 is mounted to the exterior of vehicle 50 using known means, such as brackets (not shown) welded to the fire wall for example, as depicted in FIGS. 1 and 2.

Gas flow control means 100 may be manufactured separately and come fully assembled before connecting to vehicle occupant safer device 10 or a driver-side air bag system. The two embodiments of gas flow control means 100 herein disclosed are for the most part assembled in the same manner. O-ring 328 is positioned in O-ring groove 326 in bottom 176 of seal cavity 175. Disc-shaped body 182 is positioned in seal cavity 175 and in the case of body 182 with cavity 192 and explosive charge 194 rotated so that transverse cavity 192 is aligned with access bore 112, as shown in FIGS. 5E and 5I. In both embodiments, disc-shaped body 182 is positioned within cavity 175, wherein afire 140 extends through access bore 112 to the exterior of body 110, as shown in FIGS. 5E, 5I and 6E. Referring to FIGS. 5D, 5E, 6D and 6E. Spacer member 80 is positioned in axial bore 160 with seal abutting surface 81 agains seal 190. Set screw bores 357 receive set screws 350, and screws 350 are threaded into bores 357 until screws 350 are tight against exterior wall 85 of spacer member 80, thus securing spacer member 80 and seal 190 in bore 160 of body 110. Once assembled, gas flow control means 100 is secured in an airtight fashion between canister 500 and air bag 200.

In an embodiment, bottom 115 of body 110 threadedly engages top 42 of canister 500 and is sealed by known means, such as pipe dope or tape. In an embodiment, the top 42 of canister 500 has known check valve means (not shown) such that as bottom 115 engages the canister 500, spacer member 80 depresses a check valve releasing pressurized nitrogen gas. Gas is then free to flow into entrance port 170 of axial bore 160 of body 110, thus, bringing the pressurized gas to bear upon the side 186 of frangible disc-shaped body 182.

In another embodiment, pressurized nitrogen gas is pumped from a source into canister 500 by way of refueling passage 179, in which resides check valve 172. (See FIG. 51). Refueling passage 179 connects top 113 of body 110 and axial bore 160 at a point down-stream from seal 190 permitting pressurized nitrogen gas to fill canister 500 bringing pressurized gas to bear upon seal 190. An advantage of this embodiment is that it enables vehicle occupant safety device 10, or a driver-side air bag system whichever may be the case, to be easily refueled after deployment avoiding the inconvenience and cost of returning gas flow control means 100 to the manufacturer to be rebuilt.

Once gas flow control means is secured in place, wire 140 is connected to collision sensing means 20, thus electrically connecting it with explosive charge 194 or heating element 195.

The air bag 200 of vehicle occupant safer device 10 is folded and stowed generally laterally relative to a passenger-side occupant. Storage is much more convenient, since air bag 200 has no structural liner, which makes it heavy and stiff. Air bag 200 may be stowed either entirely in the "A" pillar, or may be stowed such that a portion resides in the "A" pillar and a portion resides in the frame above the windshield (FIG. 2). A generally cylindrically-shaped inner bag 64 like the one shown in FIG. 9 is preferred, but the drawing is only for reference, and cylindrically-shaped bag 64 may have a diameter larger than depicted in FIG. 9. Mouth 77 of inner bag 64 is secured around outlet 70 of elbow 79 and fastened in an airtight fashion using knows fastening means such as a clamp. Outer bag 66 completely envelopes inner bag 64 and has mouth 77 clamped over mouth 77 of inner bag on outlet 70. Second conduit 75 may be positioned between the inner and outer bags 64,66, as shown in FIGS. 2 and 3. Inner bag 64 and outer bag 66 may be secured together by, for example sewing, so that the two bags 64,66 are integral and easily fold into their stowed position. Once folded and stowed, a removable cover (not shown) conceals air bag 200 in the "A" pillar. Existing cover designs may be used for concealing air bag 200 from view. Removable cover may be hingedly secured to the vehicle's interior or otherwise attached so it does not become a projectile capable of causing injury to the occupant(s) when a crash occurs.

Figure 15:
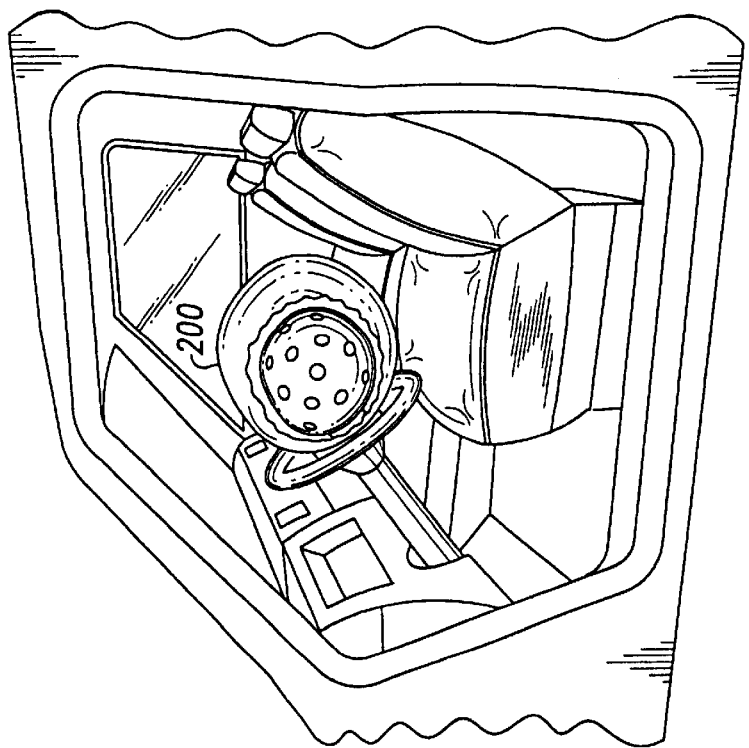
FIG. 15 is a cutaway side elevational view of the air bag of FIG. 14 shown installed in a vehicle and fully deployed.
Figure 14:
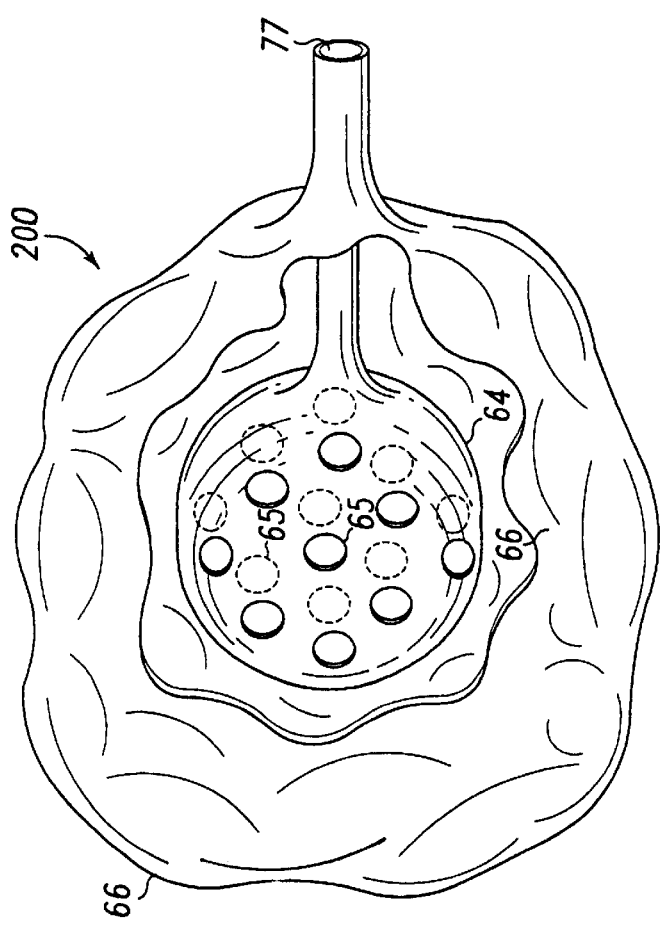
FIG. 14 is a cutaway side elevational view of an embodiment of the air bag.

Referring to FIG. 4, in the event air bag 200 is to be used in connection with a drivers-side air bag system, such as the motor vehicle steering column safety device of U.S. application Ser. No. 08 654.905 for example, generally spherically-shaped inner and outer bags 64,66 are preferable (FIGS. 10,14 and 15). Inner and outer bags 64,66 may be fastened together as desired to form air bag 200, and air bag 200 is stowed and folded much the same way except that it is stowed in the central portion of steering wheel 5.

In operation, vehicle safety device 10 primarily involves deploying air bag 200. While the following paragraphs describe deployment of air bag 200 of vehicle occupant safety device 10, it shall be understood that the operation of a driver-side air bag system utilizing gas flow control means 100 and air bag 200, as disclosed herein, operates like the same components of occupant safety device 10 of the invention. With this in mind, the following description is provided.

Upon collision, collision sensing means 20 produces an electrical signal, which is communicated through wire 140 to body 110 and to seal 190. In the embodiment using explosive charge 194, the signal ignites charge 194, causing it to explode such that a fracture is formed in body 182. Then, the rush of pressurized gas from canister 500 completes the destruction of seal 190, thereby permitting the free flow of pressurized gas from canister 500 into air bag 200. The gas flows via first conduit 73, entrance port 170 and axial bore 160. The 0.050 g charge 194 produces little sound when compared to current sodium azide inflators. Thus neither the vehicle's windshields nor the occupant's ear drums are shattered. This is especially true with element 195.

In the alternative embodiment, heat element 195 receives electrical signal as above-described. Heat energy from element 195 causes body 182 to fracture, thereby permitting the free flow of pressurized gas from canister 500 into air bag 200 via first conduit 73, entrance port 170 and axial bore 160.

As the pressurized gas flows from canister into body 110, beveled portion 191 guides the pressurized gas into the shape of a whirling vortex drawing ambient air through air passages 14 and into axial bore 160 of body 110 maximizing the rate at which air bag 200 inflates. Additionally, the vacuum created through air passages 114 also discounts the percussion generated from the rapid expansion of the gas into air bag 200. During deployment of air bag 200 the pressure inside vehicle 50 is more or less maintained at equilibrium. Thus, neither windshields nor ear drums shatter.

Figure 11:
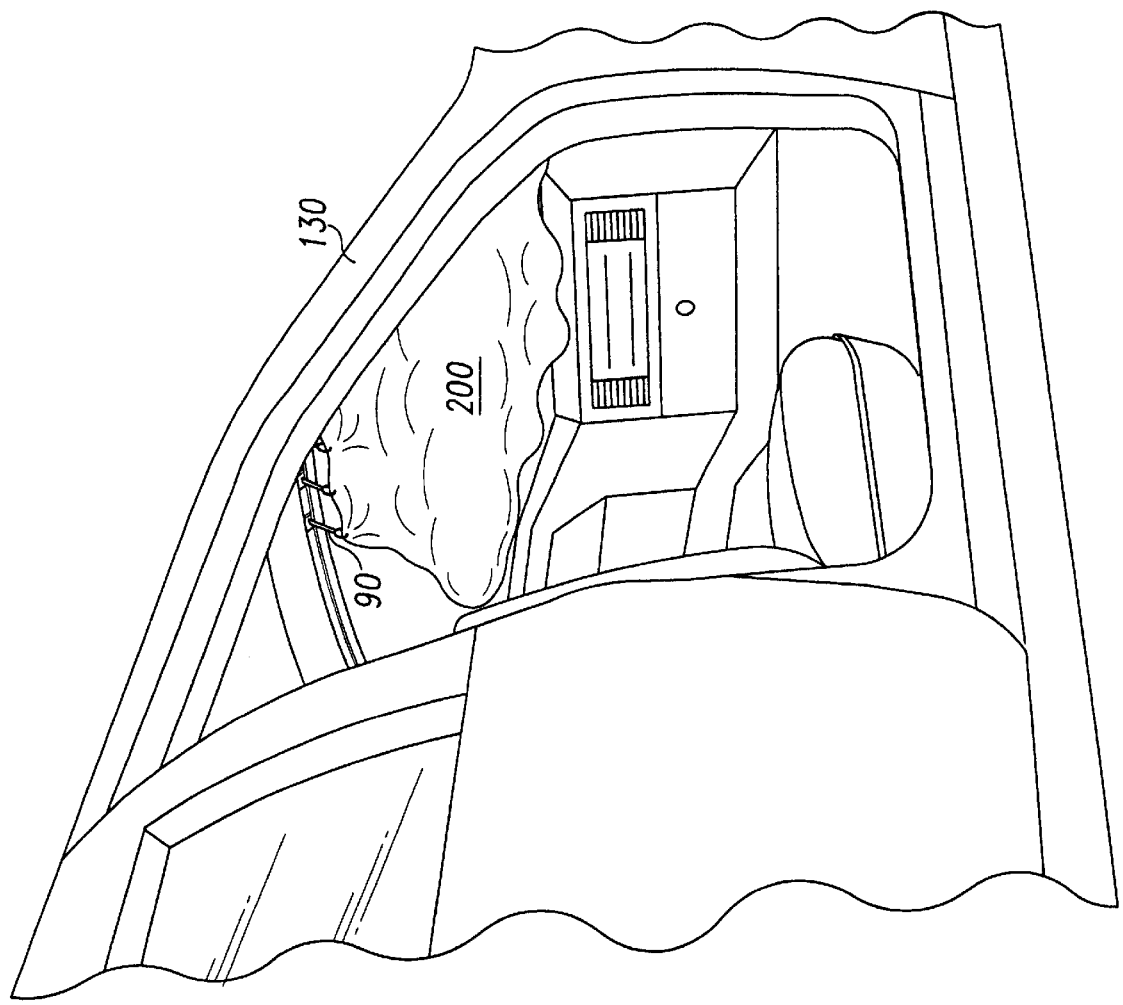
FIG. 11 is a side elevational perspective view of the safety device showing the air bag partially deployed.

Air bag 200 moves from the "A" pillar 130 into the inflated position (FIGS. 12 and 13) within 30 milliseconds. Removable cover (not shown) is removed by way of, for example, a release electrically connected to collision sensing means 20 or may simply be opened as pressurized gas expands inner bag 64. Once done, cylindrically-shaped inner bag 64 rapidly moves laterally across the front of the occupant from a generally lateral stowed position, e.g., the "A" pillar 130, toward the center of vehicle 50, also pulling outer bag 66 from its stowed position in, for example, the "A" pillar 130. Hooks 92 engage track 96 and guide outer bag 64 laterally into an inflated position, wherein cushion 400 is produced in front of the occupant (See FIG. 12). It is entertained that other carriage means may be used, whereby air bag 200 is slidably secured to the interior of the ceiling of vehicle 50. As shown in FIG. 11, outer bag 66 is pulled laterally along track 96 of guide member 94. Pressurized gas passes through inner bag 64 and inflates outer bag 66. Apertures 65 in inner bag 64 may accelerate the flow of gas from inner bag 64 to outer bag 66.

As shown in FIG. 2, another embodiment includes at least a portion of air bag 200 stowed inside vehicle 50 above the windshield and concealed with a removable cover (not shown). That embodiment has no carriage means 90, and second conduit resides between the inner and outer bags 64,66. The top of outer bag 66 is secured to the ceiling inside the passenger compartment of vehicle 50. As pressurized gas expands into inner bag 64, cylindrically-shaped inner bag 64 rapidly moves laterally across the front of the occupant from a generally lateral stowed position, e.g., the "A" pillar 130, toward the center of vehicle 50, also pulling outer bag 66 from its stowed position in, for example, the "A" pillar 130 and above the windshield. Pressurized gas passes through inner bag 64 and inflates outer bag 66. Apertures 65 in inner bag 64 may accelerate the flow of gas from inner bag 64 to outer bag 66. In the embodiment having second conduit 75, gas flows via second conduit 75 into outer bag 64, wherein cushion 400 is produced in front of the occupant (See FIG. 12).

After deployment of air bag 200 gas flow control means 100 must be either rebuilt or refueled and then assembled as above-described.

Canister 500 in conjunction with gas flow control means 100 requires no complicated gas storage, separation and flow control means. In addition, ignition of explosive charge 194 makes a sound similar to that of a child's cap gun, whereby the occupant is not injured and shattering of the vehicle's windows is precluded. And the embodiment of seal 190, which utilizes heat element 195 provides a gas flow control means 100 capable of releasing inflator gas with zero sound percussion.

The rate of flow of the gas into the air bag 200 exceeds the rate of inflatable air bag systems to date without the use of toxic chemicals or chemicals which generate extreme heat and/or cold. The gas permeability of inner bag 64 and the fact that air bag 200 requires no liner or lubricants makes air bag 200 inflate in a manner that does not create a risk of serious injury to occupants very near the bag. Moreover, the rate air bag 200 inflates can be controlled regardless of the make or model of the vehicle. The angle, length and diameter of air passages 300, axial bore 160, entrance port 170, the degree of the taper of entrance port 170, the permeability of inner bag 64 and so on, may all be provided to achieve the desired rate of deployment specific to any make or model of vehicle.

There is no chemical combustion reaction or dangerous combustion products to harm the occupant. Inner and outer bags 64,66 therefore need no liner, in which lubricating substances must be provided to prevent the interior of the bag from clinging to itself while stowed. Moreover, no screens or filters are required to catch combustion products. Body 110 totally contains frangible seal 190, and due to its composition, disc-shaped body 182 disintegrates and forms silica dust upon deployment. Any glass particles or dust produced must pass through inner and outer bags 64,66 before reaching the occupant.

Vehicle safety device 10 is safer than air bag systems heretofore available. Safety device 10 uses totally breathable nitrogen gas and deploys laterally relative to the occupant. Thus, because it deploys in a nonaggressive manner, vehicle occupant safety device 10 is a "smart" bag which automatically avoids injury, to all occupants, including infants in rear-facing child seats and out-of-position, unbelted or improperly-belted children. Clearly, vehicle occupant safest device 10 does not require a pressure sensitive mat, "tag" system or manual cutoff switch.

Finally, new vehicle occupant safety device 10 meets original equipment manufacturer's (OEM) specifications and all of the required regulations, and novel vehicle occupant safety device 10 can be cheaply manufactured and easily installed into any make and model of vehicle 50.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. For use in a vehicle with an occupant compartment and having collision sensing means connected thereto for producing a signal in response to a collision, a motor vehicle occupant safety device comprising:
   a source of inflator gas:
   at least one air bag connected to the source and stowed in a first position generally laterally relative to an occupant prior to collision, wherein at least a portion of said air bag is stowed in a pillar prior to collision: and,
   an airtight seal separating the source from the air bag, wherein upon collision the signal causes fracturing means to fracture the seal allowing the pressurized gas to flow freely into the air bag, thereby defining a cushion in front of the occupant.

2. A method of deploying an air bag connected inside an occupant compartment of a vehicle for protecting an occupant in response to a collision, which comprises:
   providing an air bag, wherein at least a portion of said air bag is stowed in a pillar prior to collision, and inflating the air bag with inflator gas, wherein the air bag inflates generally laterally relative to the occupant from a first stowed position to a second inflated position, thereby defining a cushion in front of the occupant.

* * * * *